LEOPOLD SALVATOR HABSBURG-LOTHRINGEN.
MOTOR CAR.
APPLICATION FILED NOV. 3, 1914.
1,355,853.
Patented Oct. 19, 1920.
6 SHEETS—SHEET 1.
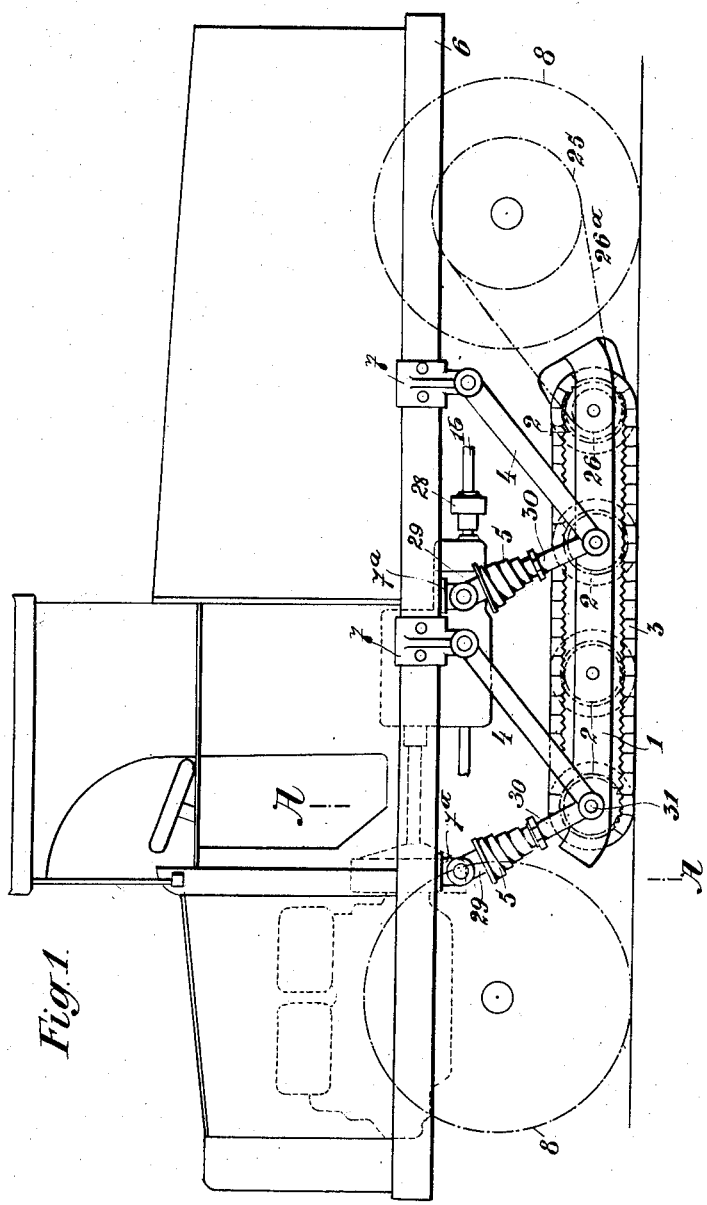

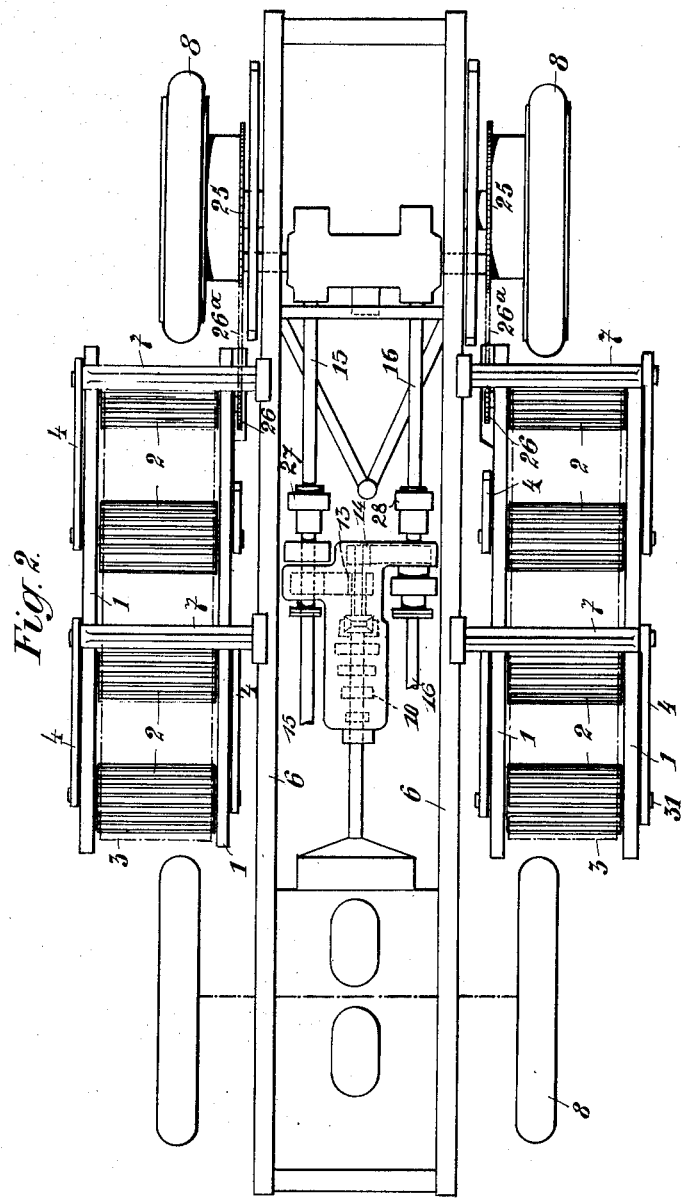

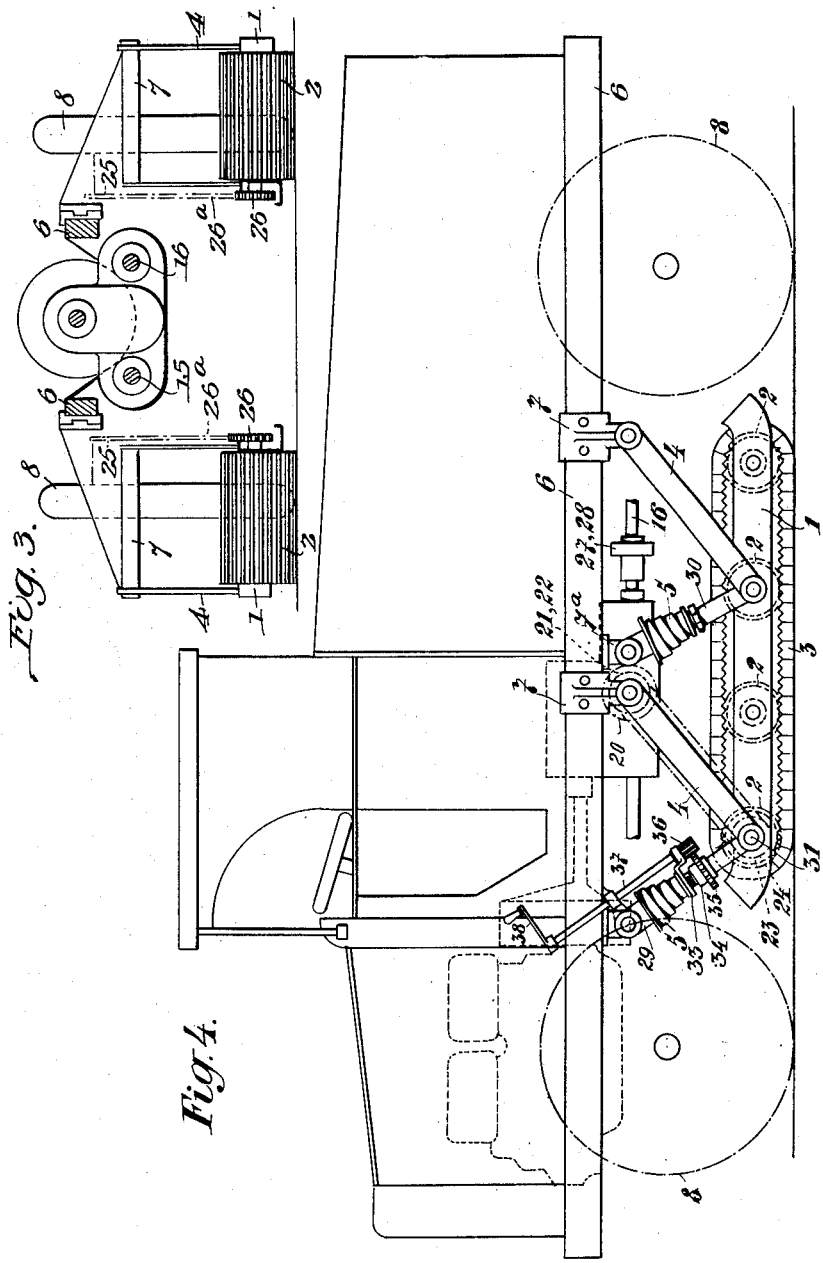

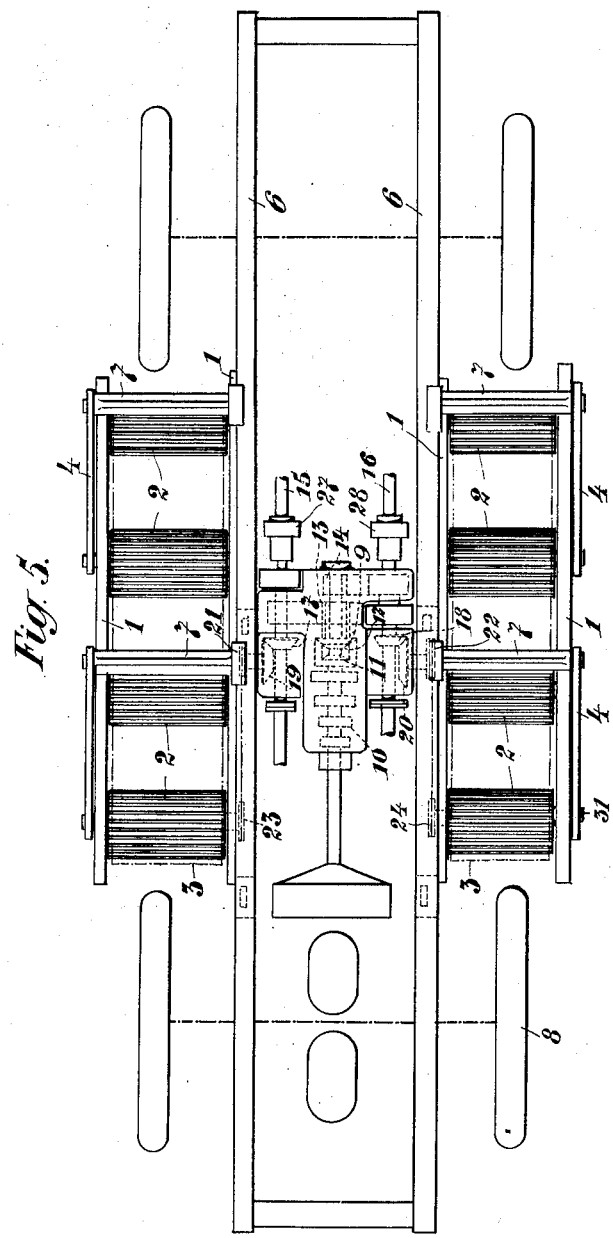

LEOPOLD SALVATOR HABSBURG-LOTHRINGEN.
MOTOR CAR.
APPLICATION FILED NOV. 3, 1914.
1,355,853.
Patented Oct. 19, 1920.
6 SHEETS—SHEET 5.
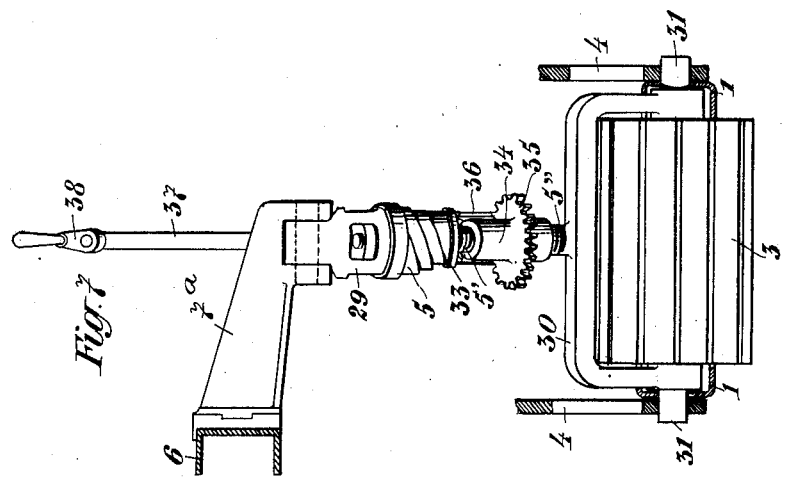
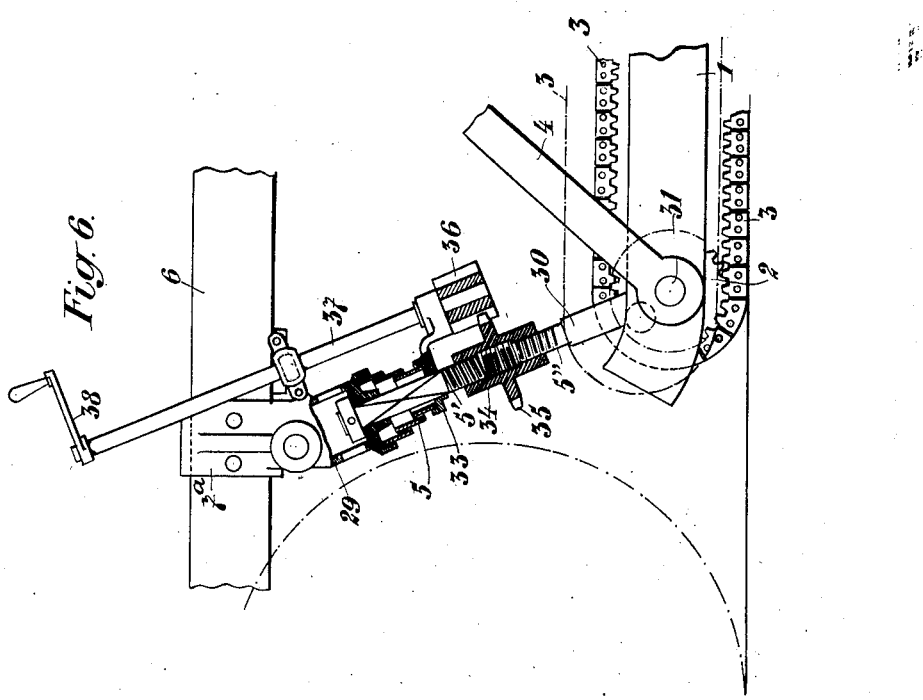

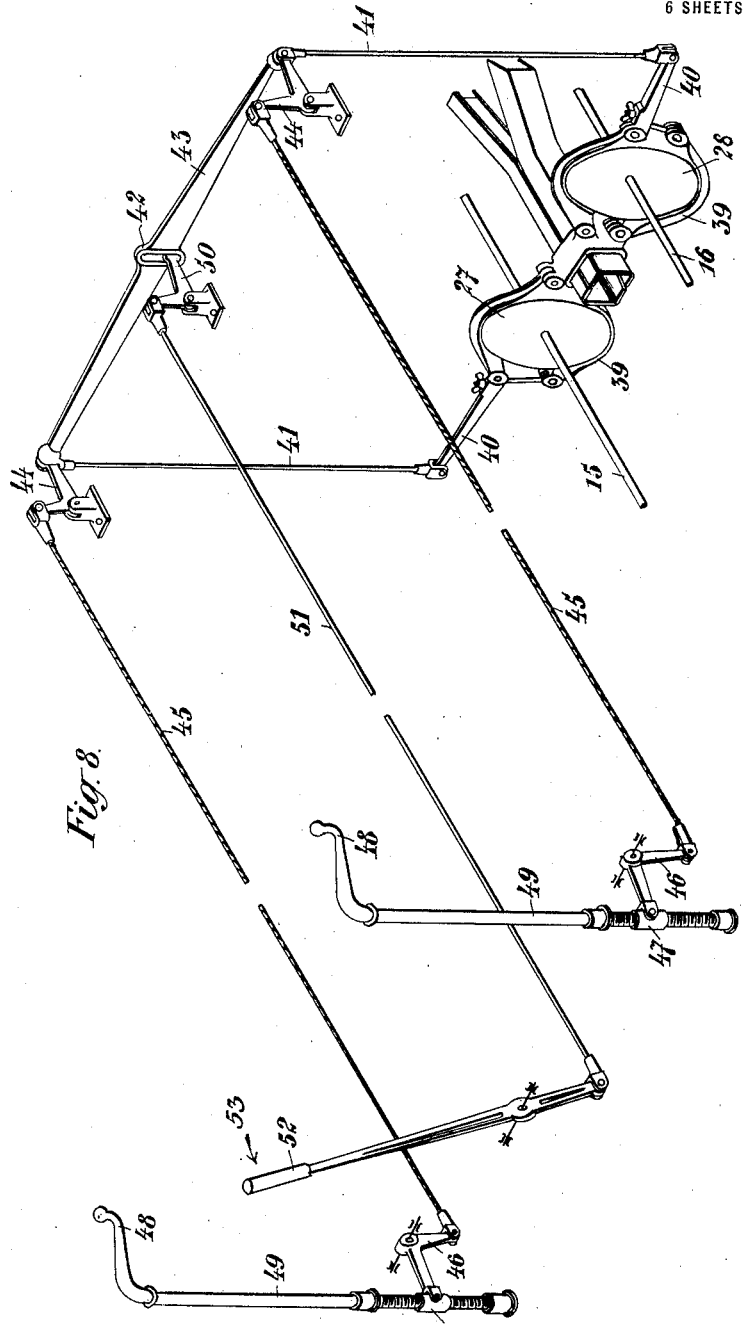

UNITED STATES PATENT OFFICE.

LEOPOLD SALVATOR HABSBURG-LOTHRINGEN, OF VIENNA, AUSTRIA.

MOTOR-CAR.

1,355,853.  Specification of Letters Patent.  Patented Oct. 19, 1920.

Application filed November 3, 1914. Serial No. 870,024.

*To all whom it may concern:*

Be it known that I, LEOPOLD SALVATOR HABSBURG-LOTHRINGEN, subject of the Emperor of Austria, residing at Vienna, Austria, XVI., Savoyenstrasse 2, have invented new and useful Improvements in Motor-Cars, of which the following is a specification.

The purpose of this invention is to produce an arrangement for motorcars, which enables to combine in efficient manner the advantage of driving by means of the ordinary wheels with the advantages of the propulsion by means of endless tracks or runners in such a manner as to avoid at the same time the drawbacks of each of said driving means. As known, the main advantage of cars provided with wheels consists in their relatively high speed, but on the other hand they have the drawback to possess only a small supporting area so that they may dig or sink and stick fast in soft grounds, as for instance fields, swamps, deep snow and the like. On the contrary the endless track vehicles are by means of their large supporting surface adapted to pass over soft grounds which never can be crossed with ordinary motorcars, but they show the drawback of a very limited velocity, the maximum of which amounts to not more than four kilometers (2.5 miles) per hour.

Now the present invention provides an arrangement, by means of which it is possible to enlarge the supporting surface of motorcars only when the car passes over soft ground to such an extent that even on the most soft ground the specific pressure remains small enough so as to prevent the car from digging into the ground. The arrangement consists in a special supporting and driving mechanism which may be raised or lowered or is easily adjustable at the carriage frame and which offers an additional supporting surface to that of the wheels, if necessary. A car provided with this auxiliary supporting and driving mechanism may thus run with high speed on solid ground or roads, the auxiliary supporting and driving mechanism being thereby removed or in raised position, and when passing over soft soil, the car after putting on or lowering the auxiliary supporting and driving means, is adapted to be driven over said ground without digging or sticking fast therein as would be the case with ordinary wheels.

It is known to attach to a car on both sides narrow driving chains provided with blades or a kind of shovels and to arrange this mechanism so that it may be raised or lowered. But these known devices have only the purpose, to increase the drive or the friction of the car to the ground, if necessary, but they are neither intended nor adapted to increase to a greater and sufficient extent the supporting surface of the car for passing over very soft ground and to prevent digging therein. Said devices are only adapted to be used in cases where the supporting surface of the wheels is great enough but where it is necessary to assist the wheels in driving, as f. i. upon snow. In contrast therewith the auxiliary supporting and driving means according to the present invention have to transmit and support the whole or greatest part of the weight and to drive at the same time the car so as to adapt it to pass over soft soils, swamps and the like, in general over grounds upon which the ordinary cars and even those provided with endless driving tracks would never be adapted to be used satisfactorily.

In order to describe my invention more fully, reference is made to the accompanying drawings in which Figure 1 is a side view and Fig. 2 a plan view of a motor car, the auxiliary supporting and driving device of which is driven by means of the rear wheels; Fig. 3 is a section on the line A—A of Fig. 1; Figs. 4 and 5 show likewise in side view and plan view a modification in which the auxiliary supporting and driving mechanism is driven by means of the change speed gear; Figs. 6 and 7 illustrate on a larger scale in cross-section and front view respectively an arrangement for raising and lowering and for adjusting the auxiliary supporting and driving mechanism and Fig. 8 shows a braking apparatus for the whole driving mechanism in a motorcar, the four wheels of which are driven by a single differential gear.

As shown in the drawings the auxiliary supporting and driving apparatus consists in two frames 1, which are arranged on both sides of the car frame between the front and the rear wheels and which carry a number of sprocket wheels, or as shown in the drawings, of toothed rolls or drums 2 being surrounded by an endless chain or band 3. These chains which are covered at their outer surface in usual manner with studs, leather, rubber or the like, may consist of several endless longitudinal straps so as to be adapted to be readily replaced. The two frames 1 supporting the rolls 2 and the endless bands 3 are suspended by means of parallel rods 4 which are pivoted at one end to the frames 1 and at the other end to brackets 7 projecting from the girder frame 6. Springs 5 arranged between the girder frame 6 and the frames 1 tend to press the endless supporting and driving tracks to the ground and permit each track to be displaced parallel to its plane. The brackets 7 are fastened detachably to the girder frame 6 so that the supporting tracks may easily be mounted and detached as desired. In the example of execution shown in Figs. 1 to 3 the springs 5 which for sake of clearness are only represented in Fig. 1, are arranged between two members the one of which, 29, is pivoted to brackets 7ª connected with the girder frame, while the other, 30, is pivoted to the frame 1, preferably to the axle 31 of the roll 2.

In addition to the brackets 7 being connected detachably with the girder frame 6, the tracks may also be provided with means for raising and lowering, so that they may be lifted from the ground against the action of the springs, while by releasing they may be brought in working position and contact with the ground when desired. Said displacement may be effected by means of an arrangement such as shown in Figs. 4, 6 and 7. In this case each member 29 pivoted to the bracket 7ª is connected with the lower member 30 forming a yoke embracing the endless track 3 and pivoted to the axle 31, by means of a rod made in two parts having opposite screw spindles 5′, 5″. In the example shown the upper part 5′ is guided in the part 29 so as to be secured against rotation and the lower part 5″ is fastened to or forms one piece with the yoke 30 embracing the track 3 and being pivoted to the axle 31. The spring 5 is seated between the member 29 and a plate 33 fastened to the part 5′. The opposite screw-threaded parts 5′ and 5″ engage with a nut 34 having corresponding screw-threaded portions. By turning the nut in one direction the part 5″ and therewith the whole track may be raised from the ground to the position indicated in dotted lines in Fig. 6, while by turning the nut in the opposite direction the track is lowered and pressed to the ground by means of the springs 5. The nut 34 may be turned by any suitable means. In the example shown in Figs. 4, 6 and 7 it is provided with a wheel 35 engaging with a pinion 36 of sufficient length so as to remain in engagement with said wheel while it is moving lengthwise with the nut 34. The pinion 36 is secured to a shaft 37 the upper end of which is provided with a crank or handle 38 situated in proximity of the driver's seat. By means of this arrangement the tracks may readily be lifted even while running and the car may at once go on with full speed when leaving the soft ground.

Of course the supporting track may also be lifted or lowered by the use of other means, as f. i., eccentrics, knee-levers and the like and the movement of said parts may be effected from the motor or any suitable source of power.

When putting the tracks to the car the rods 5′, 5″ are shortened and the tracks are inserted between the front and rear wheels in the raised position indicated in Fig. 6. This arrangement offers the advantage that the breadth of the car is not considerably increased though the tracks are relatively large (Figs. 2, 3 and 5). After the track has been fastened to the car the rods 5′, 5″ are adjusted in such a manner that the pressure of the tracks to the ground equals approximately the pressure of the four wheels 8. Said wheels which are preferably provided with any suitable anti-skid-tires then co-act with the tracks in supporting the weight of the car on soft soil.

The drive of the tracks is effected either from the wheels of the car, preferably from the rear wheels 8 by means of the chain wheels 25, 26 and chains 26ª as shown in Figs. 1 to 3 or from the motor through the intermediary of the change-speed gear as shown in Figs. 4 and 5.

Figs. 4 and 5 show an arrangement in a motor car the four wheels 8 of which are driven from a single differentiating gear. The two differentiating wheels drive each respectively the two car wheels situated at one side of the car. The gear casing 9 is rigidly connected with the shaft arranged opposite the change speed gear 10 and the two differentiating wheels 11 and 12 are connected by means of independent hollow shafts with the wheels 13 and 14 which are connected by means of chains or by means of any other suitable resilient transmission with the two main shafts 15 and 16 respectively. Bevel wheels 17 and 18 arranged upon the shafts 15 and 16 are meshing with bevel-wheels 19 and 20, respectively, which are connected with sprocket wheels 21 and 22, driving by means of chains and sprocket-wheels 23, 24 one of the rolls 2. Said roll moves the endless track-band 3 engaging with the inner toothed surface thereof.

In both examples as shown in Figs. 1–3 and 4, 5 the two main shafts 15 and 16 are provided with brake-disks 27, 28 enabling to brake the one or the other of both shafts and therewith besides the wheels 8 of one side of the car also the driving roll 2 of the corresponding supporting and driving track. This arrangement offers the possibility to make very small curves in traveling with the car. The brakes 27 and 28 when acting simultaneously also serve to brake the car. For the purpose of permitting both kinds of braking to be effected at will the brake-disks are connected with operating rods and levers of different transmission for example as shown in Fig. 8.

The brake disks 27, 28 fastened to the shafts 15, 16 are surrounded each by a brake-band 39, the brake-lever 40 of which is connected by means of a rod 41 with the ends of a balance lever 43 which is rockable about a pivot 42 and the ends of which are engaged each by a lever 44 connected by means of a cord 45 or the like, with one arm of a lever 46. The other arm of each of said levers embraces a nut 47 screwed to the spindle of a rod 49, provided with a handle 48. By turning the one or the other of the two handles the one or the other of the two brakes is put in action so that the supporting and driving track as well as the two car wheels of the corresponding side of the car are braked effectively owing to the favorable ratio of gearing of the connecting gear.

The balance-lever 43 is provided at its pivot 42 with a slot engaged by one arm of a lever 50 forming fulcrum for the balance-lever when one of the rods 49 is turned. The other arm of the lever 50 is connected by means of a rod 51 to a hand-lever 52. If the lever 52 is swung in the direction of arrow 53, the balance-lever 43 is lifted and the two brakes are drawn taut simultaneously and equally so that the carriage wheels together with the brakes on both sides of the car are braked simultaneously with a force corresponding to the smaller leverage of this gear.

Having now described my invention what I claim and desire to secure by Letters Patent is:

1. In a motor car, the combination with the car body, drive wheels and the motor; of side frames connected with each side of the body and movable vertically relatively thereto, an endless supporting track of greater width than the drive wheels, carried by each of said frames, means for driving the supporting tracks, and yielding means, interposed between the body and the side frames, for pressing the supporting tracks against the ground.

2. In a motor car, the combination with the car body, the motor and the car wheels, of auxiliary supporting and propelling means adapted to be put in action so as to assist the supporting power of the car wheels when traveling over soft ground, means for yieldingly suspending said auxiliary supporting and propelling members, means for raising and lowering said members, two shafts each driving one pair of car wheels located at one side of the car, said shafts being connected each with one of the differentiating gear wheels, means for driving the propelling surfaces at the sides of the car from the shaft driving the car wheels of the same side, respectively, and means for braking the two shafts, substantially as described and for the purpose set forth.

3. In a motor car, the combination with the car body, the motor and the car wheels, of auxiliary supporting and propelling means adapted to be put in action so as to assist the supporting power of the car wheels when traveling over soft ground, means for yieldingly suspending said auxiliary supporting and propelling device, means for raising and lowering said device, two shafts each driving one pair of car wheels located at one side of the car, each of said shafts being connected with one of the differentiating gear wheels, means for driving the propelling surfaces at the side of the car from the shaft driving the car wheels of the same side, respectively, brakes mounted upon said shafts, means for operating the brake of each shaft independently from the brake of the other shaft and means for operating both brakes simultaneously, substantially as described and for the purpose set forth.

4. In a motor car, the combination of a body, drive wheels located at opposite sides of the body, endless supporting and driving tracks, in the form of imperforate bands of greater width than the drive wheels, arranged in longitudinal alinement with said drive wheels, whereby they are adapted to constitute auxiliary supports for the car on soft ground, a motor, means for driving the wheels, and means for driving the endless supporting and driving tracks.

5. In a motor car, the combination of a body, drive wheels located at opposite sides of the body, steering wheels also located at opposite sides of the body, side frames at opposite sides of the body and connected with and movable relatively to the body, endless supporting and driving tracks, in the form of imperforate bands of greater width than the drive wheels, carried by the frames and arranged in longitudinal alinement with the drive and steering wheels, yielding means between the body and side frames for pressing the tracks against the ground, a motor, means for driving the drive wheels, and means for driving the endless supporting and driving tracks.

6. In a motor car, the combination with the car body and the motor, of four wheels adapted to support and drive the motor car with full speed when running over solid ground, two broad endless bands forming auxiliary supporting and propelling tracks arranged within frames at the sides of the car between the front and the rear wheels and adapted to support the weight of the car when traveling over soft ground, means for pressing said tracks yieldingly to the ground and gearing connections between the motor, the car wheels and said supporting and propelling tracks, substantially as described and set forth.

7. In a motor car, the combination with the car body and the motor, of four wheels adapted to support and drive the car with full speed when running over solid ground, two frames arranged at both sides of the car between the front and rear wheels, each carrying a series of endless bands arranged side by side within said frames and forming broad auxiliary supporting and propelling tracks which have a plain area sufficient to support the weight of the car when traveling over soft ground, links for suspending said frames, other links with pressure springs interposed between the car body and the frames for yieldingly pressing the tracks to the ground, means for lowering and raising the frames of the supporting and propelling tracks and gearing connections between the motor, the car wheels and said supporting and propelling tracks, substantially as described.

8. In a motor car, the combination with the car body and the motor, of four wheels adapted to support and drive the car with full speed when running over solid ground, two frames arranged at both sides of the car between the front and rear wheels, each carrying a series of endless bands arranged side by side within said frames and forming broad auxiliary supporting and propelling tracks which have a plain area sufficient to support the weight of the car when traveling over soft ground, links for suspending said frames, tie rods composed of two parts and a spring arranged therebetween being interposed between the car body and the frames for yieldingly pressing the supporting and propelling tracks to the ground, means for regulating the pressure of said springs, means for lowering and raising the auxiliary supporting and propelling tracks, and gearing connections between the motor, the car wheels and said tracks, substantially as described and set forth.

9. In a motor car, the combination of the car body carrying the motor and having four usual wheels adapted to support and drive the car with full speed when traveling over solid ground, with auxiliary supporting and propelling tracks composed of broad endless bands arranged within frames at the sides of the car between the front and the rear wheels, and having a plain area sufficient to support the weight of the car when passing over soft ground, links for suspending the tracks, tie-rods composed of two parts connected with the car body and said frames respectively and a spring arranged between the parts of each tie-rod, a nut engaging the screw threaded ends of the two parts of each tie-rod, means for turning said nut so as to lift or lower the auxiliary supporting and propelling tracks and to regulate their bottom pressure, and gearing connections between the motor, the car wheels and the tracks, substantially as described and set forth.

10. In a motor car, the combination of the car body carrying the motor and having wheels adapted to support and drive the car with full speed when traveling over solid ground, with auxiliary supporting and propelling tracks arranged within frames at the sides of the car between the front and the rear wheels and adapted to be put in action and to support the weight of the car when passing over soft ground, means for yieldingly pressing the supporting and propelling tracks to the ground, means for raising and lowering said tracks, two shafts, each carrying one pair of car wheels located at one side of the car, said shafts being connected each with one of the differentiating gear wheels, means for driving the supporting and propelling tracks at the sides of the car from the shaft driving the car wheels at the same side, respectively, and means for braking the two shafts, substantially as described and set forth.

11. In a motor car, the combination of the car body carrying the motor and having wheels adapted to support and drive the car with full speed when traveling over solid ground, with auxiliary supporting and propelling tracks arranged within frames at the sides of the car between the front and the rear wheels and adapted to be put in action and to support the weight of the car when passing over soft ground, means for yieldingly pressing the supporting and propelling tracks to the ground, means for raising and lowering said tracks, two shafts, each carrying one pair of car wheels located at one side of the car, said shafts being connected each with one of the differentiating gear wheels, means for driving the supporting and propelling tracks at the sides of the car from the shaft driving the car wheels at the same side, respectively, brakes mounted upon said shafts, means for operating the brake of each shaft independently from the brake of the other shaft and means for operating both brakes simultaneously, substantially as described and for the purpose set forth.

In testimony whereof I have signed my name to this specification in the presence of two subscribing witnesses.

LÉOPOLD SALVATOR.

Witnesses:
F. EDMUND LUNDEGRABER,
O. DE MARTINI.